May 12, 1959  L. E. WILSON ET AL  2,885,891
FORCE SENSITIVE LOAD MEASURING SYSTEM
Filed Dec. 10, 1957  2 Sheets-Sheet 1
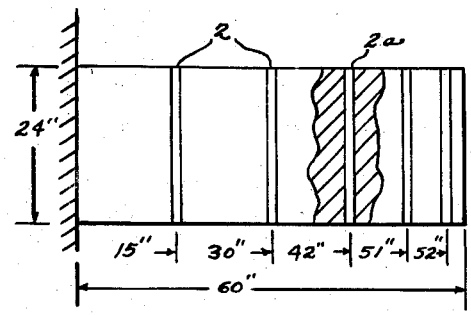
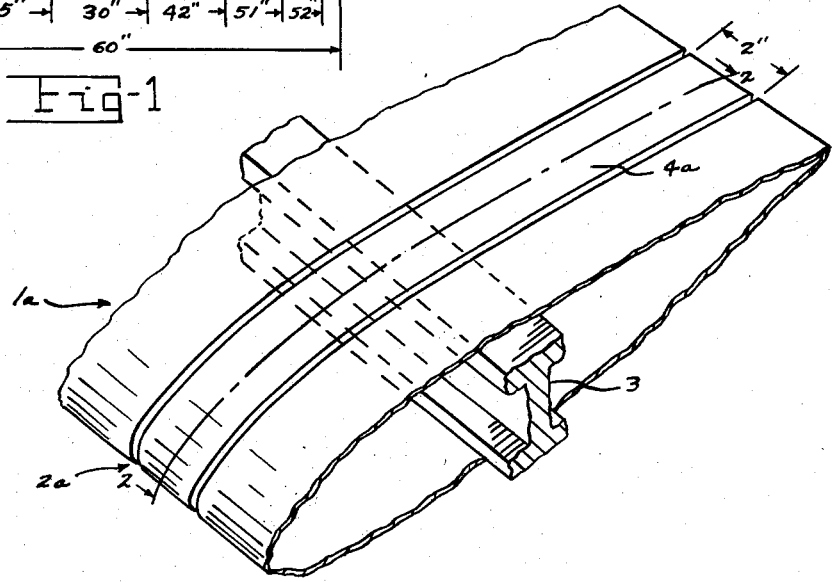
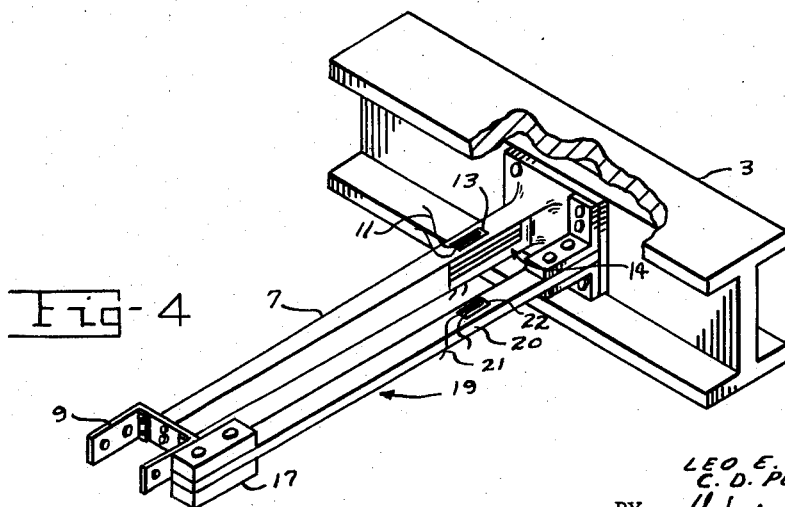
INVENTORS
LEO E. WILSON
C. D. PENGELLEY
BY
ATTORNEY
AGENT

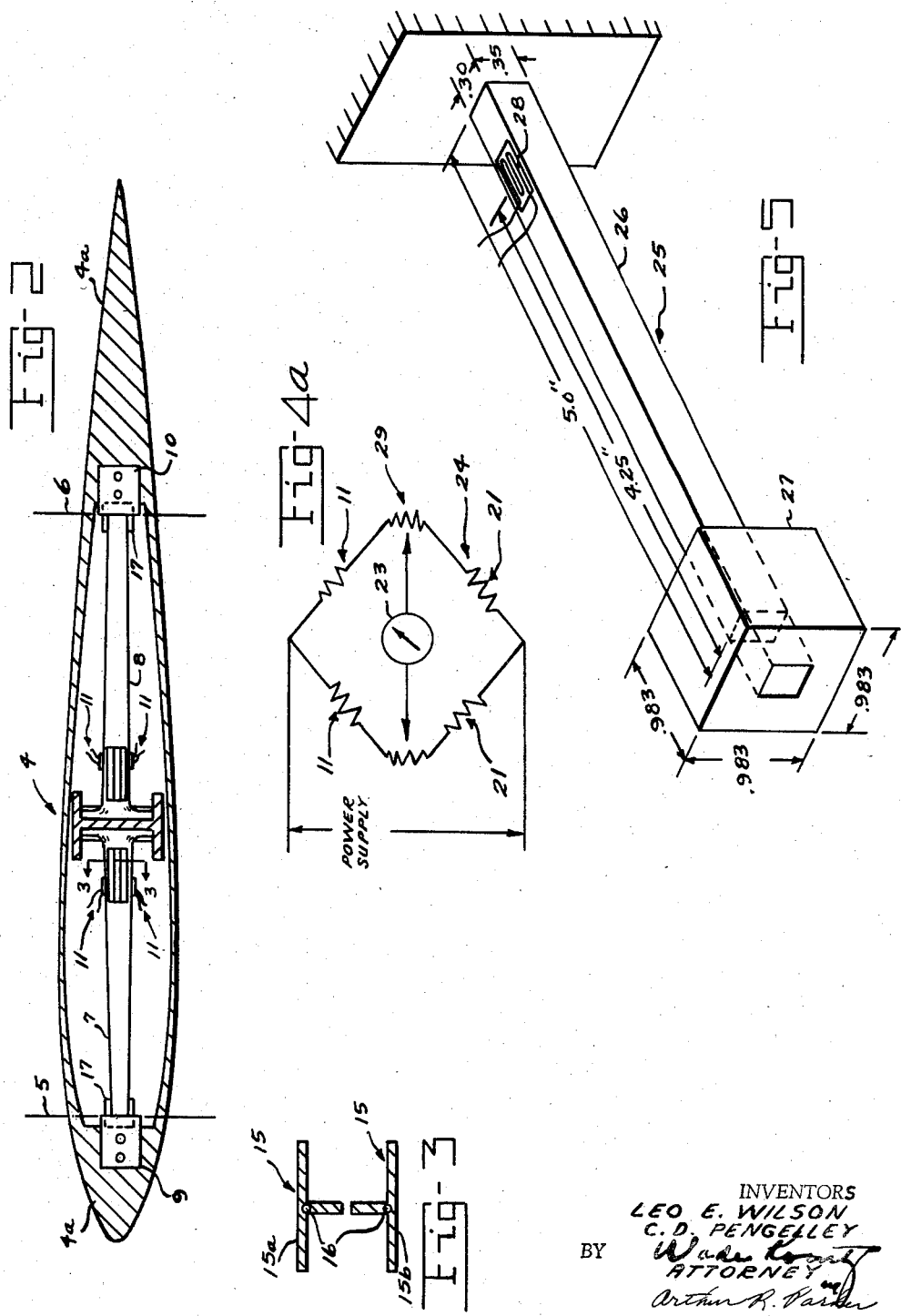

United States Patent Office

2,885,891
Patented May 12, 1959

2,885,891

FORCE SENSITIVE LOAD MEASURING SYSTEM

Leo E. Wilson, Fort Worth, Tex., and Charles Desmond Pengelley, Bel Air, Md., assignors to the United States of America as represented by the Secretary of the Air Force Application December 10, 1957, Serial No. 701,944

7 Claims. (Cl. 73—147)

This invention relates generally to the wind tunnel testing of airplane wings and, more particularly, to the use of inertia balance weights for cancelling the inertia signal induced in any force sensitive system under dynamic conditions.

In a force sensitive system, as for example, a dynamometer, inertia forces are produced on all main elements thereof by acceleration resulting in extraneous undesirable indications. In order to cancel the effect of such acceleration forces, inertia balance weights are applied to the dynamometer in the present invention to counteract the inertia forces produced therein.

It is an object of the present invention, therefore, to provide a unique means for counteracting inertia forces set up in a force-sensitive system by acceleration.

Another object of the invention utilizes a mass system producing signals equal and opposite to those coming from a force-sensitive system.

An additional object of the invention resides in a force-sensitive system, as for example, a dynamometer, in which inertia forces produced by acceleration is combined with a system of "inertia balance weights" to produce a force-sensitive system insensitive to acceleration.

A further object of the invention is in a dynamometer system for measuring oscillatory air loads on a vibrating wing in which inertia signals produced by acceleration forces are subtracted from signals produced by the dynamometer to give resultant air forces.

Other objects and advantages of the invention will become apparent from the following description, taken in connection with the accompanying drawings, in which like reference characters refer to like parts in the several figures.

Fig. 1 is a plan view of a typical wing utilized with the present invention, schematically illustrating a plurality of dynamometer elements or sections located at suitable spanwise positions.

Fig. 1(a) is an enlarged view of one of the dynamometer elements or sections of Fig. 1.

Fig. 2 is a longitudinal sectional view taken about on section 2—2 of Fig. 1(a), illustrating details of the dynamometer element or section utilized with the present invention and showing the relation of the forward and rear inertia balance weights to an airfoil section.

Fig. 3 is a cross-sectional view taken about on section 3—3 of Fig. 2, illustrating additional details of the strain gage area of the dynamometer element or section of Fig. 2.

Fig. 4 is an enlarged perspective view of details of the dynamometer section of Fig. 1(a), illustrating additional details of the forward inertia balance weight of Fig. 2 in mounted condition relative to a particular strain gage beam.

Fig. 4a is a typical strain gage circuit utilized with the invention.

Fig. 5 is another enlarged perspective view, illustrating details of the inertia balance weights utilized in the invention.

Referring particularly to Figs. 1 and 1(a) of the drawings, a typical airplane wing is indicated generally at 1 in Fig. 1 with a wing section indicated generally at 1a in Fig. 1a. A plurality of dynamometer elements 2 are located at suitable spanwise positions. As seen clearly in Fig. 1(a), one of said dynamometer elements 2a of 2" span is shown schematically located in wing section 1a. With the present arrangement of Figs. 1 and 1a, a wing span of 60", wing chord of 24", and said plurality of dynamometer elements located spanwise respectively, at 15", 30", 42", 51" and 57" is utilized for the sake of clarity, however, other dimensional arrangements may be utilized without departing from the spirit or scope of the invention. A structural spar is indicated at 3 in Fig. 1a and it is noted that the airfoil or wing fairing 4a (see Fig. 2) which constitutes the outside shape of each dynamometer element 2 does not touch or contact structural spar 3 and, in fact, floats independently therefrom as seen more clearly hereinafter.

With particular reference to Fig. 2 of the drawings, an airfoil indicated generally at 4 of the wing 1 is clearly shown with the previously mentioned airfoil fairing indicated at 4a which fairing 4a constitutes a floating shell attached at two points, namely, the forward force station 5 and the rear force station 6, through flexure pivots indicated at 9 and 10, respectivetly, to the ends of strain gage beams 7 and 8. With this arrangement, very little angular rotation occurs between fairing shell 4a and strain gage beams 7 and 8; however, to assure that moment forces are not transferred between strain gage beams 7 and 8 and the respective fairing shell 4a, said flexure pivots 9 and 10 have only a small amount of angular freedom and are utilized at each of the forward and rear force stations 5, 6 which arrangement results in two concentrated forces, one acting at said forward force station 5 and the other acting at rear force station 6. In addition, since no moment forces may be transmitted through said flexure pivots 9, 10, all bending moments acting on said strain gage beams 7 and 8 result from said concentrated forces. Strain gages indicated generally at 11 may then be applied to each strain gage beam 7, 8 to determine the magnitude of the previously referred to concentrated forces acting at the forward force station 5 and the rear force station 6. The determination of said two concentrated forces is equivalent to the determination of moment and force relative to some selected axis. The fairing 4a is made extremely light weight and each strain gage beam 7, 8 is made extremely rigid so that the natural frequency of said fairing 4a is high compared to that of the two concentrated forces to be measured. Furthermore, it has been determined that the strain gages 11 should be applied to cutout section of each strain gage beam 7, 8 as clearly seen in Fig. 4 of the drawings.

Referring particularly to Figs. 3 and 4 of the drawings, the forward strain gage beam or dynamometer 7 is shown bolted at one end to the basic structural member or wing spar 3, its other end incorporating the previously mentioned flexure pivot 9. Said forward strain gage beam 7 incorporates a relatively short cutout opening 13 on its upper and lower surfaces, each cutout opening 13 preferably containing a strain gage 11 and, in addition, said beam 7 contains a relatively elongated cutout opening indicated generally at 14 on each side surface thereof in the same area. The cutout openings 13 and 14 effect a substantial reduction in cross-sectional area resulting in an area of high stress to thereby produce a sufficiently high strain in strain gages 11 and thus provide suitable signals for recording equipment by providing a cross-section in the area of the strain measuring elements as clearly seen in Fig. 3 of the drawings. Said cross-section includes a pair of T sectional elements indicated generally at 15 with each having a centroid indicated at 16. In effect, therefore, strain gages 11 are located in a cutout opening 13 arranged in a strain-measuring area reduced by said openings 13 and 14 to leave a remaining beam structure at that point in the form of the previously mentioned pair of T sections 15 having an upper cap strip 15a and a lower cap strip 15b which are relatively far apart. With this arrangement, a line passing through centroids of respective strain gage beams 7, 8 intersects exactly at the respective forward and rear force stations 5, 6 and, in this manner, said strain gage beams 7, 8 act as a pair of struts with a constant stress over their entire area and with one surface in tension and the other or opposite surface in compression depending on the application of the force to be measured. In this connection, it is noted that the above description was made with particular reference to Figs. 3 and 4 of the drawings which depict cross-sectional and perspective views relating only to the forward strain gage beam, however, the rear strain gage beam 8 is identical thereto and for that reason its structure and operation is not repeated. Suffice to say that the previous description of forward strain gage beam 7 and any additional description thereof to follow hereinafter is equally applicable to rear strain gage beam 8. It is noted that although a pair of strain gages 11 is preferable, one only may be utilized without departing from the spirit or scope of the invention.

With the above described configuration of strain measuring elements, no shear-carrying member in the strain gage region is required and, in addition, the exact location of strain gages 11 is less critical since no local bending occurs therein. In order to minimize the total deflection at either force station 5, 6, the remainder of each strain gage beam 7, 8 is made relatively stiff and heavy. It is determined that cutout openings 13 need be only one-inch long to provide sufficient space to position strain gage 11. In order to assure that the change in section of the beams 7, 8 from the cutout openings 13 and 14 to the solid remainder of said beams does not affect strain gages 11, said cutout openings 13, 14 are made long enough to ensure uniform stress in the strain gage area. Moreover, to further ensure that the natural frequency of fairing 4a is high compared to that of the forces to be measured and that the latter are capable of producing sufficiently high strain in strain gages 11 and yet make it unnecessary to machine paper thin sections in beams 7, 8, the latter are made of material having a low modulus of elasticity with its stiffness determined by depth rather than high material stiffness. The beams 7, 8 shown in Fig. 2 may be made of magnesium, for example, with an allowable stress of 2000 lbs. per sq. inch corresponding to the air load to be measured.

With the inventive means for measurement of air loads on an airfoil or wing section in wind tunnel tests, the unbalanced inertia forces occurring at the forward force station 5 and the rear force station 6 (see Fig. 2) resulting from the mass of fairing 4a must not overshadow or outweigh the air loads to be measured. To accomplish this result, fairing 4a is made as light as possible with thin sheet metal construction or a sandwich of balsa wood with a thin magnesium sheet cemented thereto; however, a key feature of the present invention is to automatically balance out whatever inertia loads are present by utilizing inertia balance weights as will be hereinafter explained with reference to Figs. 2 and 4 of the drawings.

Referring again to Fig. 2 of the drawings, the above-mentioned inertia balance weights are indicated at 17 for the forward and rear strain gage beams 7 and 8. As seen clearly in Fig. 4 of the drawings, only the forward inertia balance utilized with forward strain gage beam 7 is illustrated; however, the rear inertia balance is mounted in the same manner on the opposite side of main support or spar 3 and is identical thereto. Each of said inertia balances indicated generally at 19 consists of a mass or weight 17 mounted on a spring arm 20 carrying a pair of strain gages 21, only the top one of which is visible. Said forward inertia balance 19 is mounted on one end of forward strain gage beam 7 which in turn is mounted on the wing spar 3 whereas rear inertia balance 19 (not shown) is mounted in identical manner on rear strain gage beam 8 on the opposite side of wing spar 3. Each of said inertia balances 19 has approximately the same natural frequency as the fairing 4a when so mounted to assure that the dynamic response thereof to any acceleration force is at least approximately similar to the response of the dynamometer fairing 4a. Said spring arm 20 consists of a relatively elongated member having a cutout opening 22 similar to cutout opening 13 of forward strain gage beam 7 in which cutout opening 22 said pair of strain gages 21 giving opposite signals are mounted. With the two forward inertia balance strain gages 21 and the forward beam strain gages 11 adapted to give opposite signals used as the arms of an electrical bridge circuit as clearly seen in the strain gage circuit indicated generally at 24 in Fig. 4a, the reading on gage 23 will indicate the resultant aerodynamic forces on the forward force station 5 of airfoil 4 since said circuit will effect a neutralization or counterbalance of the inherent inertia forces resulting from oscillation of the wing 1. Moreover, since the forward and rear inertia balances are located entirely within wing 1, they are unaffected by air loads and, therefore, only the strain gage beams 7 and 8 receive said air loads. An identical bridge circuit 24 may be utilized for the rear force station 6.

With the above-described system, the inertia balance weights are tuned to the same natural frequency as is dynamometer fairing 4a in which event substantially all of the inertia forces on airfoil 4 are counterbalanced thereby; however, it is to be emphasized that the achievement of exactly the same natural frequency has been found impracticable but so long as measurements are not made at frequencies approaching that of either system and so long as the inertia forces are kept in the same order of magnitude as the air forces to be measured, accuracy within 5% is obtained with the inertia balance system 19 of the inventive device. If, for example, a natural frequency of 585 radians per second is desired, a particular design of inertia balance system as clearly illustrated hereinafter with particular reference to Fig. 5 of the drawings may be utilized without departing from the spirit or scope of the invention.

Referring now to Fig. 5 of the drawings, an inertia balance system almost identical to that previously described is generally indicated at 25 and includes a 5" long spring arm 26 rigidly attached at one end as is the spring arm 20 previously described with reference to Fig. 4 of the drawings. On the free end of said spring arm 26 may be mounted a 0.29 lb. brass weight 27 in the form of a cube, 0.983 inch by 0.983 inch by 0.983 inch, with its center of gravity 4.25 inches from strain gage 28. With the above inertia balance system 25, a natural frequency of 585 radians per second was experimentally determined. Thus, if the particular dynamometer fairing 4a was experimentally found to be 585 radians per second, the inventive inertia balance system 19 could be specifically tuned as in Fig. 5 to substantially the same natural frequency in order to substantially eliminate inherent inertia forces due to acceleration in measuring aerodynamic forces applied to an oscillating wing during wind tunnel tests. In other words, the natural frequency of dynamometer fairing 4a is measured experimentally and then brass weight 17 or 27 is drilled out or built up until its frequency matched that of said fairing 4a.

Referring again to Fig. 4a of the drawings, an adjustable balancing resistor indicated generally at 29 is positioned in the bridge circuit 24 which resistor 29 enables adjustment of the net output from bridge circuit 24 to zero for oscillation of wing 1 at various frequencies and amplitudes.

Thus, a new and unique system has been developed by the present invention wherein an improved inertia balance weight system 19, 25 is utilized with a dynamometer system for accurate measurement of aerodynamic forces on an oscillating wing 1 during wind tunnel tests. Furthermore, a simplified inertia balance weight system has been devised which is easy to assemble to the dynamometer system and yet ensures that more than 95% of the inertia loads produced by acceleration forces on said oscillating wing are eliminated to thereby assure accurate measurement of aerodynamic forces.

We claim:

1. A force-sensitive system for measuring air loads on an oscillating wing comprising a streamlined fairing shell having a leading edge and a trailing edge, a structural member positioned transversely of said fairing shell out of contract with said fairing shell, a pair of strain gage beams extending at right angles to and between said structural member and said fairing shell adjacent said leading and trailing edges rigidly affixed at their inner ends to opposite sides of said structural member and respectively attached to said fairing shell adjacent said leading and trailing edges by a flexure pivot, a relatively short cutout opening in each of said pair of strain gage beams adjacent the ends thereof nearest said structural member, a pair of strain gages mounted in each of said cutout openings adapted to produce combined inertia and aerodynamic force signals on oscillation of said wing, and means in operable engagement with said strain gage beams for counteracting the inertia portion of said combined inertia and aerodynamic force signals resulting from inherent interfering inertia loads on oscillation of said wing, said inertia force signal counteracting means comprising a pair of spring arms mounted respectively at one end on the ends of said strain gage beams nearest said structural member parallel to said strain gage beams, a weight mounted on the free end of each spring arm adjacent a respective flexure pivot and substantially tuned to the natural frequency of said fairing shell, and a pair of strain gages mounted in each of said spring arms at their ends nearest said structural member adapted to produce independent inertia force signals adapted to combine with said combined inertia and aerodynamic force signals.

2. In an airplane wing adaptable for oscillatory mounting in a wind tunnel, a preselected air foil having a leading edge and a trailing edge and fairing streamlining said airfoil from said leading edge to said trailing edge, a main support member mounted independently and freely of said air foil faring, a pair of dynamometer beams rigidly attached, respectively, at their inner ends between opposite sides of said main support member and attached by a flexure pivot at their opposite outer ends, respectively, to said leading and trailing edge fairing transversely of said main support member, a first pair of strain gages mounted in each of said dynamometer cantilever beams adaptable for sensing combined aerodynamic and inertia forces on said airfoil during oscillation of said wing, means substantially eliminating inherent inertia forces sensed by said first pair of strain gages, said means comprising a pair of elongated members weighted at opposite outer ends thereof adjacent flexure pivots and each having a second pair of strain gages mounted therein adjacent their inner ends adjacent opposite sides of said main support adaptable for sensing inertia forces on said airfoil, and bridge circuit means adaptable for applying said inertia forces to said combined aerodynamic and inertia forces to balance the inertia forces of said combined aerodynamic and inertia forces.

3. In an airplane wing adaptable for oscillatory movement in a wind tunnel as in claim 2, said means comprising a pair of elongated spring arms rigidly mounted at one end to the inner ends of said pair of dynamometer beams and free at their other ends, a balance weight mounted on said free ends, and a second pair of strain gages positioned in each of said pair of spring arms adjacent their rigidly mounted ends sensing inertia forces and adaptable for connection in a bridge circuit containing said first pair of strain gages.

4. In an aircraft wing adaptable for mounting for oscillation in a wind tunnel, means for measuring accurate aerodynamic forces on at least one selected airfoil of said aircraft wing during said oscillation, said means comprising, a wing spar, a selected air foil having streamlined fairing between its leading and trailing edges constituting a floating shell relative to said wing spar, a pair of force-sensitive members positioned normal to and on opposite sides of said wing spar between said wing spar and said fairing respectively adjacent said leading and trailing ages, each of said pair of force-sensitive members rigidly attached at their inner ends to opposite sides of said wing spar and attached for limited bending movement at their outer ends to said fairing, a pair of force sensing devices measuring combined areodynamic and inertia forces positioned in each of said force-sensitive members adjacent their outer ends, said force sensing devices adaptable for connection in a bridge circuit for recording of said combined aerodynamic and inertia forces, and a pair of inertia balance weighted members mounted parallel and adjacent to a respective force-sensitive member in rigid attachment at one end to said respective force-sensitive member and having means adaptable for sensing inertia forces and recording said inertia forces in said bridge circuit to balance the inertia forces of said combined aerodynamic and inertia forces.

5. In an aircraft wing as in claim 4, each of said force-sensitive members constituting a strut-like beam with one acting in compression and the other acting in tension, each of said beams having a predetermined cutout opening on the upper and lower surfaces thereof and a cutout portion on the side surfaces thereof in the region of said upper and lower surface cutout openings, and said pair of force sensing devices consisting of a pair of strain gages mounted in said upper and lower surface openings, said upper and lower surface openings and said side surface cutout portions constituting a cross-sectional region of minimum area in each of said beams to provide the maximum strain on said strain gages on oscillation of said wing.

6. In an aircraft wing as in claim 4, each of said pair of inertia balance weighted members comprising an elongated spring arm member having a predetermined weight on the end thereof remote from its rigid attachment tuned to the natural frequency of said airfoil fairing to ensure a substantially similar dynamic response to acceleration forces.

7. In an aircraft wing as in claim 4, said last-named means comprising a cutout opening in each of said pair of weighted members and a pair of strain gages positioned therein adaptable for sensing inertia forces substantially identical to the inertia forces of said combined aerodynamic and inertia forces.

References Cited in the file of this patent

UNITED STATES PATENTS

| | | |
|---|---|---|
| 2,183,078 | Kemler | Dec. 12, 1939 |
| 2,768,526 | Trimble et al. | Oct. 30, 1956 |
| 2,785,569 | Miller | Mar. 19, 1957 |